US012664752B2

(12) United States Patent
Rathi et al.

(10) Patent No.: US 12,664,752 B2
(45) Date of Patent: Jun. 23, 2026

(54) SYSTEMS AND METHODS FOR DETECTION OF A SURFACE MATERIAL ON OPTICAL COMPONENTS

(71) Applicant: Apple Inc., Cupertino, CA (US)

(72) Inventors: Anup Rathi, Milpitas, CA (US); Mark Linder, Westminster, CO (US); Julia Benndorf, Mountain View, CA (US); Duncan A. Mcroberts, Boulder, CO (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 18/356,767

(22) Filed: Jul. 21, 2023

(65) Prior Publication Data

US 2024/0029395 A1     Jan. 25, 2024

Related U.S. Application Data

(60) Provisional application No. 63/369,367, filed on Jul. 25, 2022.

(51) Int. Cl.
| | |
|---|---|
| G06T 7/90 | (2017.01) |
| G01M 11/02 | (2006.01) |
| G06T 5/40 | (2006.01) |
| G06T 5/80 | (2024.01) |
| G06V 10/50 | (2022.01) |

(52) U.S. Cl.
CPC ......... G06V 10/50 (2022.01); G01M 11/0257 (2013.01); G06T 5/40 (2013.01); G06T 5/80 (2024.01); G06T 7/90 (2017.01); G06T 2207/10024 (2013.01)

(58) Field of Classification Search
CPC .... G06T 5/40; G06T 5/80; G06T 7/90; G06T 2207/10024; G06T 2207/30041; G06T 7/0002; G06V 10/50; G01N 2021/9583; G01N 21/958; G01M 11/02; G01M 11/0257; G01M 11/0278
See application file for complete search history.

(56) References Cited

U.S. PATENT DOCUMENTS

| | | | |
|---|---|---|---|
| 10,827,918 B1 | 11/2020 | Nuriel et al. | |
| 11,269,406 B1 | 3/2022 | Sztuk et al. | |
| 2008/0291433 A1 | 11/2008 | Kajino et al. | |
| 2016/0216801 A1 | 7/2016 | Shedletsky et al. | |
| 2017/0112057 A1* | 4/2017 | Loukili | A01D 41/127 |
| 2018/0035088 A1* | 2/2018 | Nose | H04N 9/3182 |

(Continued)

OTHER PUBLICATIONS

Non-Final Office Action received for U.S. Appl. No. 18/332,536, mailed on Aug. 13, 2025, 19 pages.

(Continued)

*Primary Examiner* — Duy M Dang
(74) *Attorney, Agent, or Firm* — Kubota & Basol LLP

(57) ABSTRACT

A surface material on one or more optical components of an optical sensing system can be detected. In some embodiments, a method of detection includes generating a first image using the optical sensing system. In accordance with a determination that one or more criteria are satisfied, the one or more criteria including a criterion that is satisfied when a proportion of the first image having an intensity of light in a first intensity range is greater than a threshold, a surface material is detected on the first attachable lens.

20 Claims, 7 Drawing Sheets

(56)　　　　　References Cited

U.S. PATENT DOCUMENTS

| | | |
|---|---|---|
| 2018/0164535 A1 | 6/2018 | Brown |
| 2019/0125183 A1 | 5/2019 | Lane et al. |
| 2019/0357766 A1 | 11/2019 | Spratt |
| 2022/0192483 A1 | 6/2022 | Lee |
| 2023/0200639 A1 | 6/2023 | Yehezkel et al. |
| 2023/0218160 A1 | 7/2023 | Lai |
| 2023/0417627 A1 | 12/2023 | Rathi et al. |

OTHER PUBLICATIONS

Notice of Allowance received for U.S. Appl. No. 18/332,536, mailed on Nov. 4, 2025, 9 pages.

* cited by examiner

SYSTEMS AND METHODS FOR DETECTION OF A SURFACE MATERIAL ON OPTICAL COMPONENTS

CROSS-REFERENCE TO RELATED APPLICATIONS

This application claims the benefit of U.S. Provisional Application No. 63/369,367, filed Jul. 25, 2022, the content of which is incorporated herein by reference in its entirety for all purposes.

FIELD OF THE DISCLOSURE

This relates generally to systems and methods for detection of a surface material on optical components of an optical sensing system, and more particularly to detecting a surface material present on a prescription lens or a display of the optical system that reduces image quality.

BACKGROUND OF THE DISCLOSURE

Prescription lenses may have a significant effect on user experience when utilizing an optical sensing system. However, various materials present on a surface of a prescription lens and cause a reduction in image quality for the user. For example, fog can condense on the prescription lens or on the display and negatively impact user experience.

SUMMARY OF THE DISCLOSURE

Some embodiments of the disclosure are directed to techniques for detecting a surface material on components of an optical sensing system. An electronic device can generate an image that includes reflections from a component of the optical sensing system (e.g., an attachable lens, a display) and detect a surface material based on a proportion of the image having an intensity of light in an intensity range. In some embodiments, the device can generate the image with a controlled light sequence from one or more light sources of the optical sensing system. In some embodiments, the device can determine the proportion by computing a histogram of luminance values in the image.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

Some embodiments of the disclosure are directed to techniques for detecting a surface material on components of an optical sensing system. An electronic device can generate an image that includes reflections from a component of the optical sensing system (e.g., an attachable lens, a display) and detect a surface material based on a proportion of the image having an intensity of light in an intensity range. In some embodiments, the device can generate the image with a controlled light sequence from one or more light sources of the optical sensing system. In some embodiments, the device can determine the proportion by computing a histogram of luminance values in the image.

Figure 1:
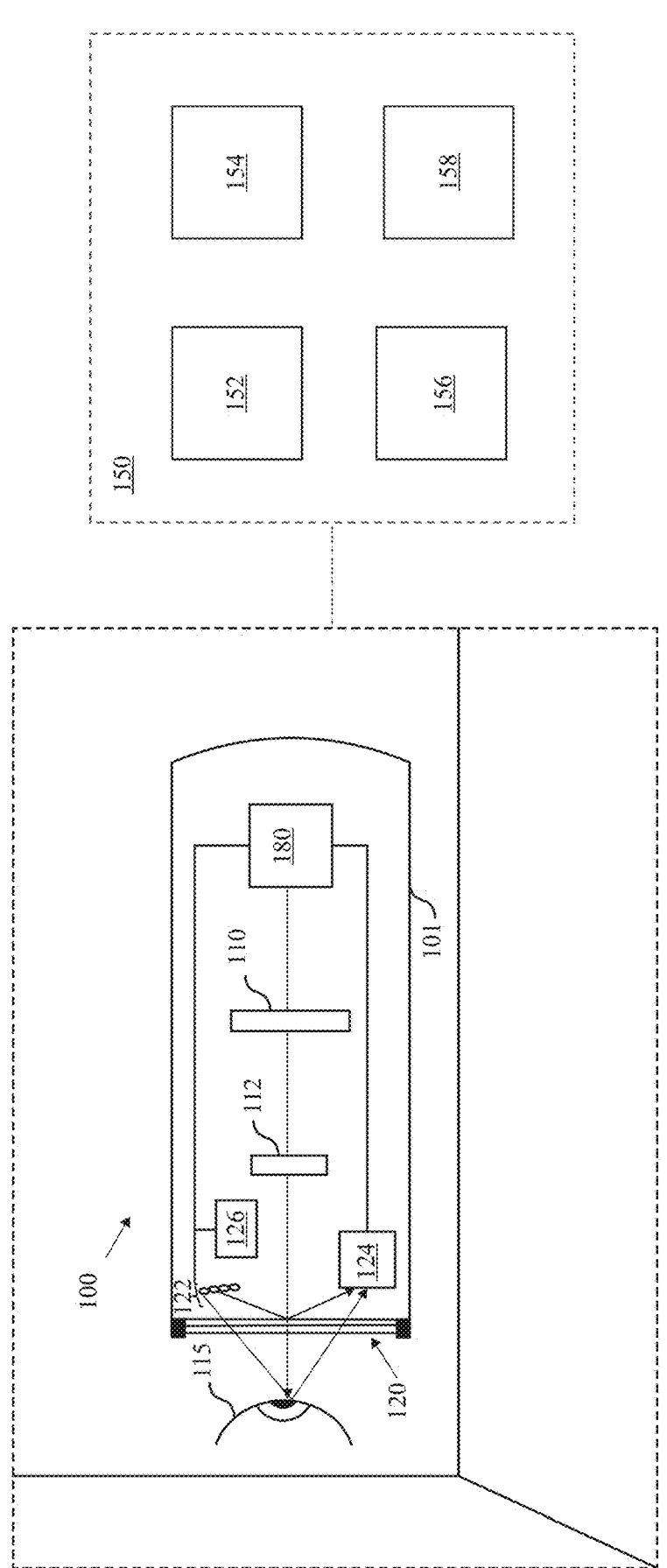
FIG. 1 illustrates a block diagram of an example optical sensing system according to some embodiments of the disclosure.

FIG. 1 illustrates a block diagram of an example optical sensing system 100 according to some embodiments of the disclosure. The optical sensing system 100 can include a housing 101 (or enclosure) that houses various components, and can be in communication with an electronic device. In some embodiments, the optical sensing system 100 can be a head-mounted device and the housing 101 can be configured to rest against a face of a user to keep the optical sensing system 100 in a relatively fixed position on the face of the user (e.g., surrounding the eye(s) 115 of the user). In other embodiments, the optical sensing system 100 can be glasses, goggles, a visor, a mask, a helmet, or other head-mounted device. The housing 101 can include a display 110 that displays an image, emitting light towards or onto the eye 115 of the user. In various embodiments, the display 110 can emit the light through an eyepiece having one or more lenses 112 that refracts the light emitted by the display 110, making the display appear to the user to be at a virtual distance farther than the actual distance from the eye to the display 110. To enable user focus on the display 110, in various embodiments the virtual distance can be at least greater than a minimum focal distance of the eye (e.g., 7 cm). Further, in order to provide a better user experience, in some embodiments, the virtual distance can be greater than 1 meter.

The housing 101 can also house a tracking system including one or more light sources 122, image sensor 124, and a controller 180. The controller 180 can include one or more processing components (e.g., a central processing unit (CPU) or a digital signal processor (DSP) for processing various functions for the optical sensing system 100. The one or more light sources 122 can emit light onto the eye 115 of the user that reflects as a light pattern (e.g., one or more glints such as a circle) that can be detected by the image sensor 124 (e.g., camera). Based on the light pattern, the controller 180 can determine the presence of a lens and/or characteristics of the lens (e.g., prescription). In some embodiments, the controller 180 can determine the presence of a material on the lens (e.g., fog). In some embodiments, the one or more light sources 122 can emit light onto the eye of the user to illuminate the eye, and images of the eye can be processed by controller 180 to determine an eye tracking characteristic of the user. In another example, the controller 180 can determine a blinking state (eyes open or eyes closed) of the user. As yet another example, the controller 180 can determine saccadic movements, a pupil center, a pupil size, or a point of regard. In some embodiments, the light from the eye 115 of the user can be reflected off a mirror or passed through optics such as lenses or an eyepiece before reaching the image sensor 124.

In some embodiments, the display 110 can emit light in a first wavelength range, the one or more light sources 122 can emit light in a second wavelength range, and the image sensor 124 can detect light in the second wavelength range. In some embodiments, the first wavelength range can be a visible wavelength range (e.g., a wavelength range within the visible spectrum of approximately 400-700 nm), and the second wavelength range can be a near-infrared wavelength range (e.g., a wavelength range within the near-infrared spectrum of approximately 700-1400 nm), or any other wavelength range outside of the visible light wavelength range. In some embodiments, the light source 122 and the image sensor 124 can use overlapping wavelengths when illuminating the eye for eye/gaze tracking. Alternatively, the light source 122 and the image sensor 124 can use the same spectrum to illuminate the eye for eye/gaze tracking while the user is looking at the display 110 showing content within the visible spectrum. In some embodiments, when the display is inactive (e.g., deactivated, turned off, not displaying images, etc.), the one or more light sources 122 and one or more image sensors can emit and detect light in the first wavelength range.

As shown in FIG. 1, a lens 120 can optionally be removably or permanently attached to the optical sensing system 100. In some embodiments, the lens 120 can be attached using the housing 101 of the optical sensing system 100. Lens 120 can include any suitable transparent lens for altering a perception of images appearing on the display 110 as seen by the user's eyes. For instance, lens 120 can be a corrective lens that has a diopter (e.g., prescription, for correcting the user's vision). In such configurations, the lens 120 can help the user see images appearing on the display 110 with improved clarity and sharpness. However, for the optical sensing system 100 to accurately provide content for the user, the optical sensing system 100 may need to know the prescription of (or other information about) the lens 120. One way for the optical sensing system 100 to access information about the lens 120 is to detect reflections of light generated at the one or more light sources 122 caused by a first surface (e.g., front surface) and/or a second surface (e.g., back surface) of the lens 120. In some embodiments, the reflections of the one or more light sources 122 caused by the lens 120 can be detected using a sensor in the optical sensing system 100 such as the image sensor 124. For example, the reflections of the one or more light sources 122 caused by lens surfaces can be captured by the image sensor 124, and the information contained therein can be decoded by the controller 180 and used to modify operations of the optical sensing system 100. Although often described as a prescription lens, it is understood that sometimes the lens described herein may be a protective lens or other component of the optical system that is not used for vision correction. Additionally, it is understood that the optical sensing system can include one or more light sources and one or more light detectors (e.g., image sensors), even though the description often references to a singular light source or image sensor.

In some embodiments, the light sources 122 can generate light that reflects off the front surface and/or the back surface of the lens 120. The light sources 122 can be light emitting diodes (LEDs) or any other suitable light emitting source. In some embodiments, a pattern of reflections off the lens can be detected in one or more images taken by the image sensor 124 when the eye tracking functionality is not being used. In one embodiment, the pattern of reflections off the lens can be detected when eye tracking is enabled, and content is displayed (or not displayed) in a specific area of the display 110.

In some embodiments, the light sources 122 can generate light that reflects off the front surface and/or the back surface of the lens 120 into the image sensor 124. In this manner, the optical sensing system 100 can be used to detect a surface material on the lens 120, as detailed herein (e.g., FIGS. 4A-4B). In some embodiments, the housing 101 can house hardware components that can be used to reduce or remove a surface material. In some embodiments, the housing can include a hardware defroster 126 configured to reduce or remove the surface material (e.g., to remove fog). Additionally or alternatively, the housing 101 and/or lens 120 can include a thermally-conducting material configured to reduce or remove the surface material (e.g., reduce or remove fog).

In various embodiments, the image sensor 124 can be a frame/shutter-based camera that, at a particular point in time or multiple points in time at a particular frame rate, captures an image of the eye 115 of the user. Each image can include a matrix of pixel values corresponding to locations of a matrix of light sensors of the camera.

In some embodiments, the image sensor 124 can have a single field of view (FOV) that is used for both eye tracking functionality and detection of lens characteristics of the lens 120. In other embodiments, the image sensor 124 can have multiple fields of view with differing parameters such as size, magnification, or orientation with respect to the lens 120. The image sensor can have a first FOV used for eye tracking and a second, different FOV used for detection of the lens characteristics of the lens 120.

In some embodiments, the optical sensing system 100 can be communicatively coupled to device 150, which can be a smart phone, a tablet computer, a laptop computer, or any other suitable portable or non-portable electronic device that is separate from the optical sensing system 100. For example, device 150 and optical sensing system 100 can each include communication circuitry (e.g., wireless communication circuitry) to enable communication therebetween. However, in other embodiments, the functionality of device 150 and optical sensing system 100 can be integrated into a single electronic device or distributed differently between multiple devices.

In some embodiments, device 150 can include one or more display generation components such as display 152, one or more processors 154, one or more memories 156, one or more input devices 158 (e.g., touch sensor panels, trackpads, buttons, joysticks, microphones, etc.), and other components (e.g., wired or wireless communication circuitry, output devices such as speakers, tactile feedback generators, etc.). One or more communication buses not shown in FIG. 1 can optionally be used for communication between the aforementioned components within device 150.

In some embodiments, processors 154 can include one or more general purpose processors, one or more graphics processors, and/or one or more digital signal processors (DSPs). In some embodiments, memory 156 can be a non-transitory computer-readable storage medium (e.g., flash memory, random access memory, or other volatile or non-volatile memory or storage) that stores computer-readable instructions configured to be executed by processors 154 to perform the techniques, processes, and/or methods described herein. In some embodiments, memory 156 can include a non-transitory computer-readable storage medium. A non-transitory computer-readable storage medium can be any medium (e.g., excluding a signal) that can tangibly contain or store computer-executable instructions for use by or in connection with the instruction execution system, apparatus, or device. The non-transitory computer-readable storage medium can include, but is not limited to, magnetic, optical, and/or semiconductor storage. Examples of such storage include magnetic disks, optical discs based on compact disk (CD), digital versatile disk (DVD), or Blu-ray technologies, as well as persistent solid-state memory such as flash, solid-state drives, and the like.

In some embodiments, display 152 can include a single display (e.g., a liquid-crystal display (LCD), organic light-emitting diode (OLED), or other types of display). In some embodiments, display 152 can include multiple displays. In some embodiments, display 152 can include a display with a touch-sensitive surface (e.g., a touch screen), a projector, a holographic projector, a retinal projector, etc.

Figure 2:
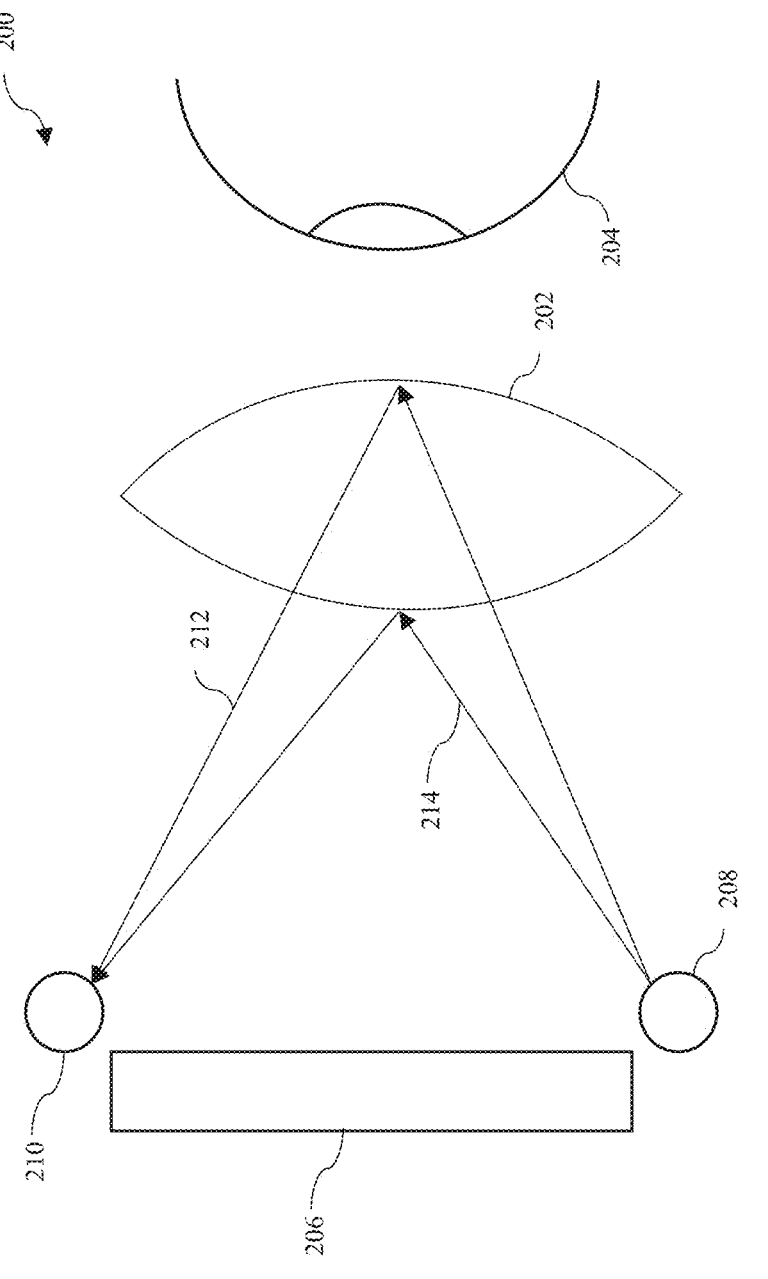
FIG. 2 illustrates an example symbolic hardware diagram of a system for detecting a surface material on a lens according to some embodiments of the disclosure.

FIG. 2 illustrates an example symbolic hardware diagram of a system 200 for detecting a surface material on a lens 202 (e.g., corresponding to lens 120) according to some embodiments of the disclosure. The system 200 can use any of the processes described herein, including the processes in FIGS. 4A-4B. The system 200 can be part of an optical sensing system, such as the optical sensing system 100 illustrated in FIG. 1, or any suitable hardware system for attaching a lens. The lens 202 can be a prescription lens configured for a user of the system 200. The housing can include a display 206 for displaying an image towards or onto the eye 204 of the user (e.g., corresponding to eye 115). The housing can include one or more light sources 208 (e.g., corresponding to one or more light sources 122) for generating light. The light sources 208 can be light emitting diodes (LEDs) or any other suitable light emitting source. The light sources 208 can be controlled by a processing unit (e.g., corresponding to controller 180 or processor 154 of FIG. 1, not shown in FIG. 2) to release (e.g., emit) a controlled light pattern or sequence at a predetermined time (e.g., responsive to user input or automatically when the user wears the system 200). In some embodiments, a subset of the light sources 208 can be selected to release the controlled light sequence. The light from the light sources 208 can reflect off a surface of the lens 202 towards or onto a camera 210 (e.g., corresponding to image sensor 124). The light can reflect off a front surface or a back surface of the lens 202 follow light paths 212, 214. The camera 210 can be any suitable camera for capturing an image of a surface of the lens 202. Although FIGS. 1-2 show one or more lights sources and one or more image sensors disposed to emit light toward a lens and to capture reflections from the lens, it is understood that the same or different light source(s) and/or image sensor can be used to emit light toward other component(s) of the optical sensing system and/or to capture reflections from the other component(s) of the optical sensing system. For example, one or more additional light sources and one or more additional image sensor may be orientated to emit light to and detect reflections from the display 206 (e.g., while the display is off). In some embodiments, the pattern of light sources of the display 206 (e.g., display LEDs) can be detected by an image sensor without the need for external light source(s). In some embodiments, the same camera 210 used for detection of a surface material on a lens can capture additional surfaces of the system 200, such as a surface of the display 206. Each image can include a matrix of pixel values corresponding to locations of a matrix of light sensors of the camera 210.

Figure 3:
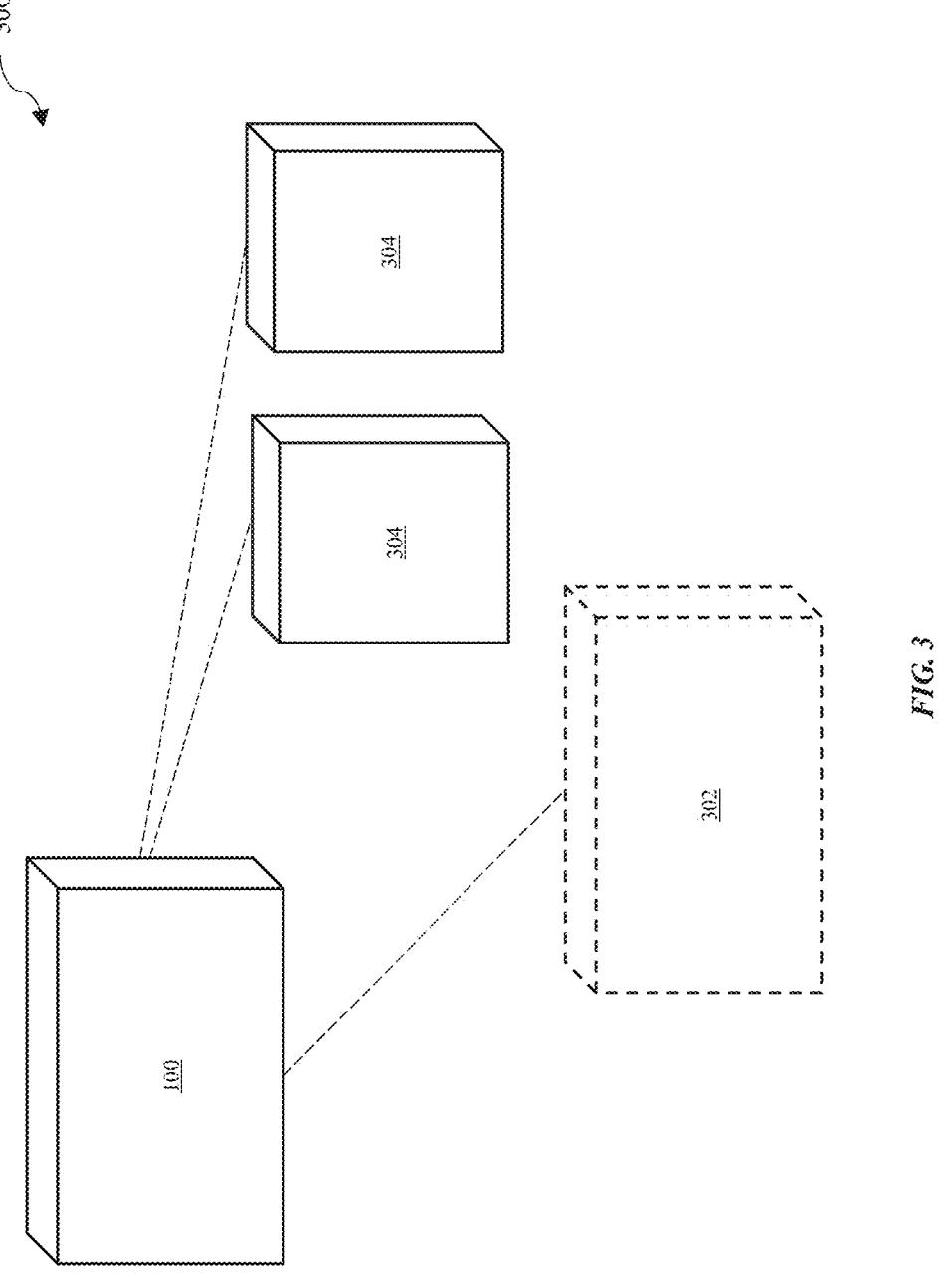
FIG. 3 illustrates an example symbolic hardware diagram of a system for detecting ocular events according to some embodiments of the disclosure.

FIG. 3 illustrates an example symbolic hardware diagram of a system 300 for detecting ocular events according to some embodiments of the disclosure. In some embodiments, system 300 can represent an electronic device that includes and/or is in communication with optical sensing system 100, which can be a wearable device such as glasses, goggles, a visor, a mask, a helmet, or other head-mounted device. In some embodiments, optical sensing system 100 can be communicatively coupled to device 302 (e.g., corresponding to device 150), which can be a smart phone, a tablet computer, a laptop computer, an auxiliary device in communication with another device, a wearable host device, etc. In some embodiments, optical sensing system 100 can additionally or alternatively be communicatively coupled to one or more devices 304, which can be accessory devices such as a pointing device, handheld touch controllers, gloves, etc. In some embodiments, system 300 can comprise only a single optical sensing system 100 (and optional accessory devices 304), with the functionality of device 302 included in optical sensing system 100 (e.g., optical sensing system and the functionality of device 302 can be integrated into the same electronic device).

Figure 4A:
FIGS. 4A-4B illustrate an example flowchart of a method for detecting a surface material according to some embodiments of the disclosure.
Figure 4A:
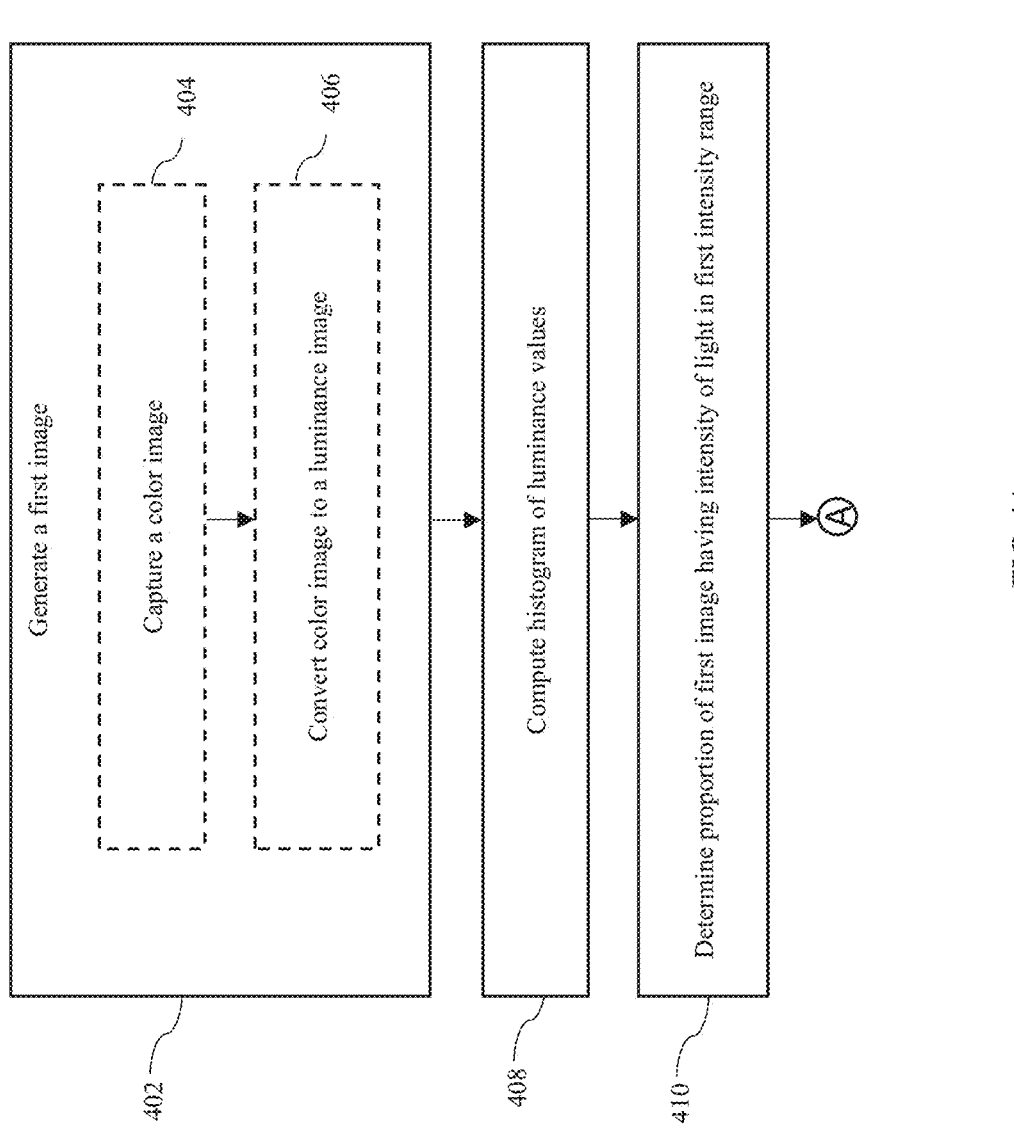
Figure 4B:
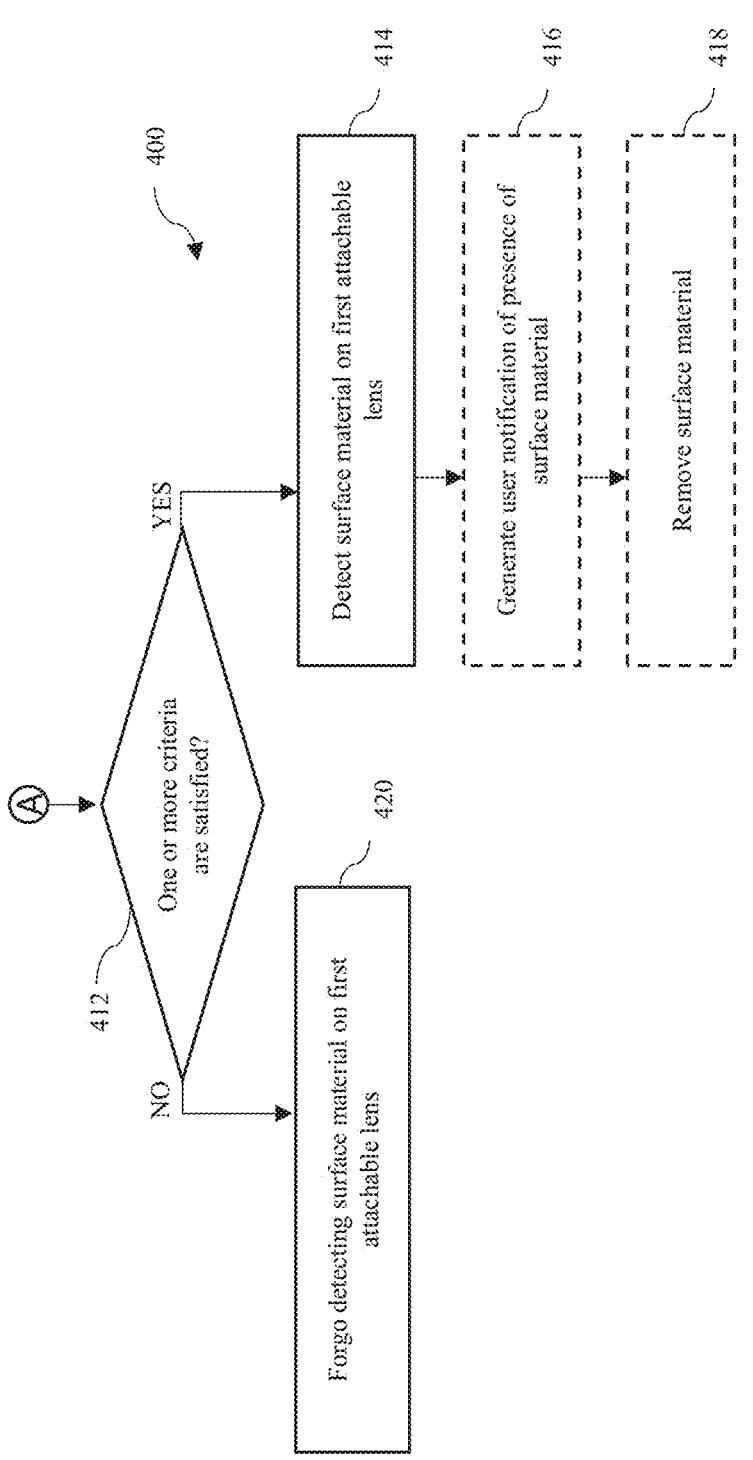

As described herein, in some embodiments, surface material on a component of the optical system can be detected. FIGS. 4A-4B illustrate an example flowchart of a method 400 for detecting a surface material on an optical component (e.g., a prescription lens, a display, etc.) according to some embodiments of the disclosure. The method 400 can be performed at the optical sensing system 100 of FIG. 1 (e.g., using controller 180), at an electronic device in communication with an optical sensing system, such as device 150 in communication with optical sensing system 100 as shown in FIG. 1, or at a combination of both the optical sensing system 100 and the device 150. Some of the operations in method 400 can be optionally combined or omitted, and the order of some operations can be optionally changed. Some of the operations in method 400 can be performed more than once, sequentially, or in parallel.

As described below, method 400 provides an efficient way to detect a surface material on an optical component (e.g., prescription lens, display) and thereby improve user experience (e.g., by reducing or removing the surface material or notifying the user to do so). Prescription lenses can be attached (e.g., clipped on, inserted into a slot, or otherwise positioned, held or disposed) between a user's eyes and an internal display of the optical sensing system. The cleanliness of the prescription lenses may have a significant effect on user experience during use of the optical sensing system. For example, surface materials (e.g., fog or dirt) may be present on the prescription lenses and reduce the image equality of any images the user views on the internal display. Therefore, it can be advantageous to ensure that such surface materials are detected and/or removed from the prescription lenses efficiently and accurately. For example, detection of a surface material on the lens (or display) can be used to notify the user to remove the surface material (e.g., clean the lens). Additionally or alternatively, detection of the surface material can cause a process to remove the surface material (e.g., using a hardware defroster or other cleaning system).

In some embodiments, an image can be generated, as shown in block 402. The image can be represented as a matrix of pixel values capturing a surface of a lens, such as a prescription lens, attached to the optical sensing system, or a surface of any part of the optical sensing system. The image can be captured by an image sensor, such as a frame/shutter-based camera attached to the optical sensing system (e.g., image sensor 124 in FIG. 1). The image sensor can capture an image after one or more light sources (e.g., light source(s) 122 in FIG. 1) release a controlled light pattern or sequence towards the lens. The light from the light pattern or sequence can reflect off a surface of the lens towards the image sensor. In some embodiments, the light sources can be attached to the optical sensing system and/or can be part of the optical sensing system. In some embodiments, the controlled light sequence can be released upon detecting a suitable event (e.g., a user begins wearing the optical sensing system, a lens is inserted into the optical sensing system, and/or the display is deactivated, etc.). In some embodiments, the controlled light sequence can be released upon receiving an indication of a selection to initiate a surface material detection process. In some embodiments, the controlled light sequence can be released periodically during use of the optical sensing system.

In some embodiments, the image can be a "gray-scale" matrix of luminance values, optionally generated using light outside the visible range (e.g., infrared or near infrared light). In such an embodiment, each pixel can have one value representing the luminance value at the pixel. In some embodiments, a color image can be captured, as shown in block 404. In such an embodiment, the color mage can be converted to a luminance image, as shown in block 406. The color image can be a matrix of red-green-blue (RGB) pixel values (e.g., each pixel can have three values representing red, green, and blue light). The RGB values of the image can be converted to luminance values using any suitable RGB-to-luminance conversion process. In some embodiments, the luminance conversion process can include using a weighted combination of the RGB values. In some embodiments, the weights can reflect the luminous efficiency function, with green values receiving the most weight and blue values receiving the least weight. In some embodiments, the luminance values can be represented using 8-bit integer ranging from 0 to 255. However, it is understood that a wide range of formats can be used for the luminance values using fewer or more bits (e.g., 32-bit integers, floating point values, etc.). Additionally or alternatively, it is understood that although an RGB color image is described, that other representations of light can be included using fewer or more wavelengths of light.

In some embodiments, a histogram of luminance values in the first image can be computed, as shown in block 408. A wide range of bin sizes can be used for the histogram, such as using bins with a size of 1 unit from 0 to 255 for an 8-bit integer luminance scale. In some embodiments, the bin size can be five units. In some embodiments, the distribution of luminance values or counts of pixels with luminance values in particular ranges be computed without use of a histogram.

In some embodiments, a proportion of the first image having an intensity of light in a first intensity range (e.g., proportion of a luminance image that has pixels in the mid-tone intensity range) can be determined, as shown in 410. The intensity of light of each pixel in the first image (optionally converted from color to luminance/gray-scale image) can correspond to the luminance value of the pixel. In some embodiments, the first intensity range can be defined by a first value (e.g., minimum value for the first intensity range) and a second value (e.g., maximum value for the first intensity range). For example, the first value can be set between 5% to 15% of a total intensity range for images and the second value can be set between 85% to 95% of a total intensity range for images. In some embodiments, the first value can be 10%±2% of a total intensity range for images (~20-30 on the 8-bit scale) and the second value can be 90%±2% of a total intensity range for images (~224-235 on the 8-bit scale). The first and second values can be determined empirically and tuned to improve performance of detection of a surface material (or to detect different types of surface materials). The proportion can be determined by computing a percentage of the luminance values of the first image having values between the first value and the second value. In some embodiments, the proportion can be determined using a percentage value. In some embodiments, the proportion can be determined using a count of the luminance values of the first image having values between the first value and the second value.

In some embodiments, a determination can be made about whether one or more criteria are satisfied (at block 412). In some embodiments, in accordance with a determination that one or more criteria are satisfied, a surface material can be detected on the first attachable lens, as shown in block 414. The surface material can be any material capable of dispersing light traveling towards the lens, such as fog, dirt, oil, ink, etc. The one or more criteria can include a criterion that is satisfied when the proportion of the first image having an intensity of light in the first intensity range is greater than a threshold (e.g., a percentage or count). The threshold can be a predetermined value or can be adjusted by a user or administrator. In some embodiments, the threshold can be between 5% and 10%. In some embodiments, the threshold can be adjusted automatically (e.g., with machine learning) based on one or more variables, such as image type and environmental variables. In some embodiments, the threshold may depend on the size of the image (or subset(s) of the image) evaluated as part of method 400.

In some embodiments, a user notification of the detection of the surface material can optionally be generated when the surface material is detected on the first attachable lens, as shown in block 416. In some embodiments, the user notification can be displayed on the display of the optical sensing system, or at an electronic device in communication with the optical sensing system. Additionally or alternatively, the user notification can include auditory and/or haptic feedback at the optical sensing system and/or the electronic device. In some embodiments, the notification can include user instructions for removing the surface materials (e.g., clean the lens). The user notification can be displayed as part of a user interface displayed by the system.

In some embodiments, the surface material can optionally be removed by the system (or a process to reduce or remove the surface material can be initiated by the system), as shown in block 418. If the surface material is fog or any other type of moisture/condensation, a hardware defroster (e.g., a fan) can be used to reduce or remove the surface material. The hardware defroster can be attached to the optical sensing system or can be an external device. Additionally or alternatively, the lens can include or contact a thermally conductive material configured to reduce or remove the fog or condensation. Other suitable methods can be used for fog or other types of surface materials (e.g., wipers, compressed air, chemical solutions, heaters, etc.).

In some embodiments, in accordance with a determination that the one or more criteria are not satisfied (at block 412), the system can forgo detecting the surface material on the lens, as shown in block 420.

It is to be appreciated that while the above description of method 400 is described for detecting a surface material on a lens, method 400 can be used for a wide range of surfaces of optical components where surface materials can be detected, such as the display of the optical sensing system (e.g., display 110 in FIG. 1). In some embodiments, a second controlled light sequence can be released from the light sources (same or different as used for the first surface) to detect a surface material on a second surface using an image sensor (same or different as used for detecting the surface material on the first surface). In some embodiments, the second controlled light sequence can be released from a second set of light sources. In some embodiments, the second set of light sources can be situated near the lens and oriented towards the display of the optical sensing system. In some embodiments, a second image sensor can be situated near the lens to capture the second controlled light sequence after the second controlled light sequence reflects off the display.

Figure 5A:
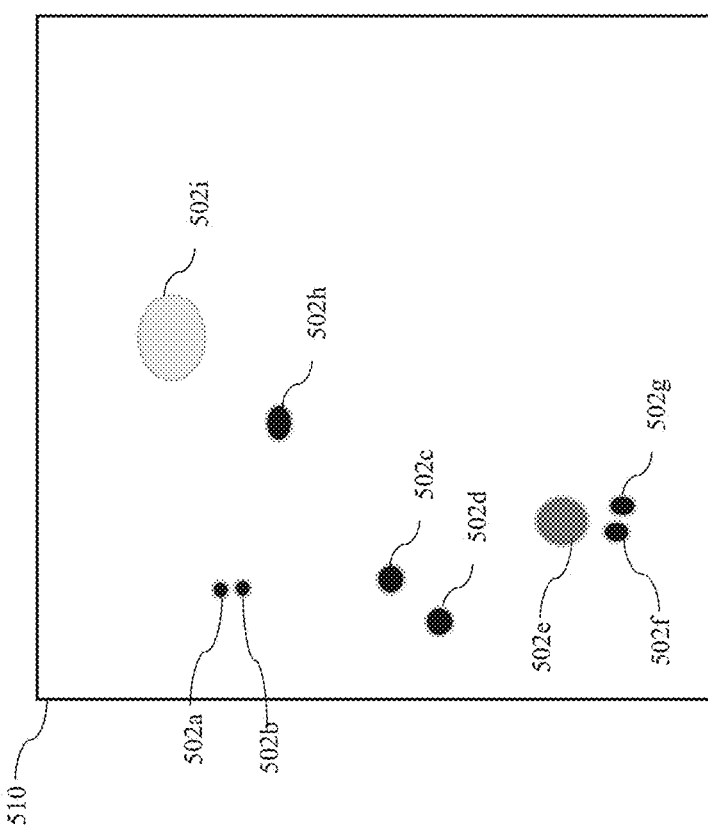
FIGS. 5A-5B illustrate example images of a lens including reflections of light sources according to some embodiments of the disclosure.
Figure 5A:
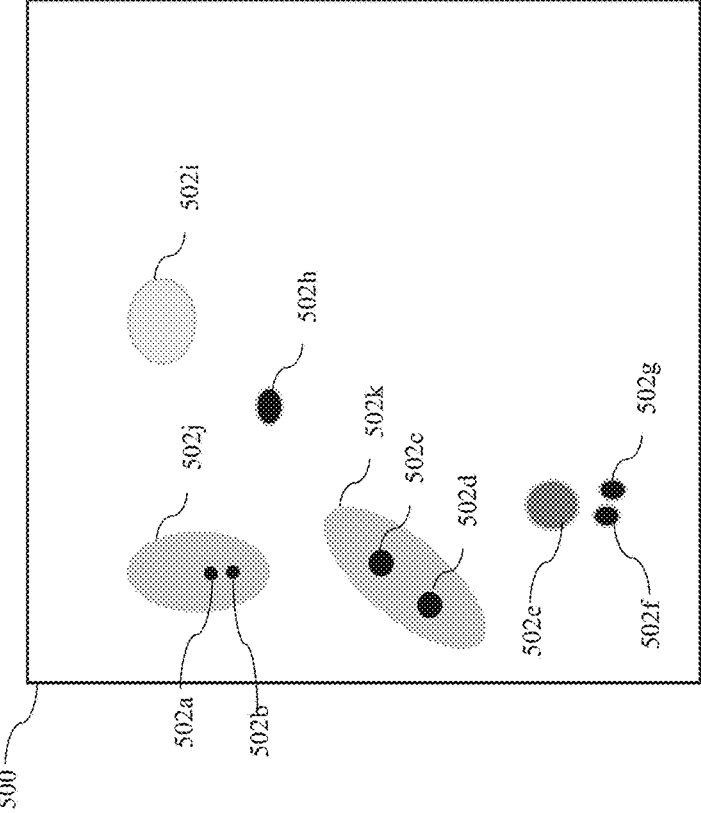
Figure 5B:
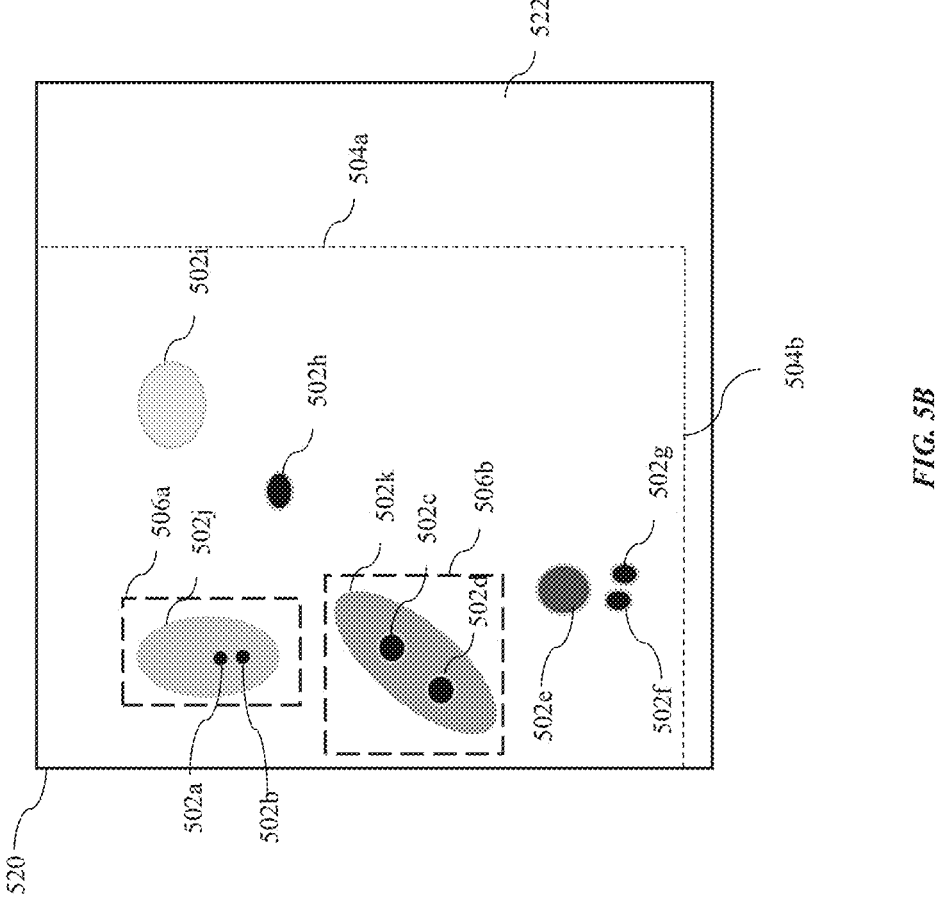

FIGS. 5A-5B illustrate example images of a lens including reflections of light sources according to some embodiments of the disclosure. One or more light sources (e.g., light sources 122 in FIG. 1) can emit light toward a prescription lens and cause reflections of light therefrom. As shown in image 500, a pattern of reflections 502a-502k can be captured by an image sensor (e.g., image sensor 124 in FIG. 1). Each reflection in the pattern of reflections 502a-502k can be a reflection off a front surface of the lens or a back surface of the lens. In some embodiments, the reflections 502a-502k can include both reflections off the front surface and reflections off the back surface, thus creating pairs of reflections (e.g., 502a and 502b, 502c and 502d, 502f and 502g, etc.). In some embodiments, the reflections 502a-502k can be reflections off another surface in an optical sensing system, such as display 110 in FIG. 1. Each reflection in the pattern of reflections 502a-502k can have a corresponding light intensity value (e.g., a luminance value). As shown in image 500, reflections 502a-502h correspond to relatively high intensity values while reflections 502i-502k correspond to midrange intensity values. The remainder of the image can correspond to relatively low intensity values. For example, reflections 502a-502h can have intensity values that are 90% to 100% of a total intensity range for images. Reflections 502i-502k can have intensity values that are 15% to 85% of the total intensity. As described with method 400 in FIGS. 4A-4B, a proportion of midrange intensity values in the image above a threshold can indicate a surface material (e.g., fog) is present on the lens. For example, method 400 can be performed to determine that reflections 502i-502k are areas where a surface material is present. The surface material can then be removed manually by a user or by a surface material removal process (e.g., block 418). Image 510 shows the pattern of reflections 502a-502h without a surface material or after the surface material has been removed. As shown in image 510, reflections 502i-502k are not present or are decreased in area as compared with image 500 (e.g., reducing the proportion of midrange intensity values to be below the threshold).

In some embodiments, rather than processing the entire image, the detection can be performed using a subset of an image (a sub-image). For example, in some embodiments, the controlled light sequence may be examined for a subset of the image at which the light is incident and reflects on. In some embodiments, fog can be incapable of forming on a subset of the lens and such a subset can be ignored. Method 400 (or any of the methods mentioned herein) can then be performed on the subset of the image while ignoring the rest of the image. In some embodiments, method 400 can include an operation to crop the image after generation (e.g., prior to computing a histogram or determining a proportion of first image having intensity of light in first intensity range). In this manner, method 400 can be processed more efficiently and accurately. FIG. 5B illustrates an image 520 with a subset defined by dashed lines 504a-b, such that subset 522 of the image 520 can be excluded. It is to be appreciated that while the subset is illustrated as being a rectangle, the subset can be any suitable shape such as an oval or a polygon. Although cropping is described above, in some embodiments, the subset of the image can be processed without cropping the image (e.g., selecting the subset). Additionally, it is understood that although one subset of the image is described, that method 400 can examine multiple subsets of the image (e.g., sub-images) in some embodiments (e.g., excluding portions of the generated image outside the selected subsets). For example, the controlled light sequence may be incident on and/or reflect from specific locations on the lens. A subset around each of these specific locations can be cropped/selected (e.g., subsets 506a-506b). In some embodiments, the size of the subset can be the same for each of the specific locations. In some embodiments, the size of the subset can be different among the specific locations. In some embodiments, the size of the subset can be based on the light incident on and/or reflected from a respective specific location. For example, the subset 506a around reflections 502a-502b may be smaller than the subset 506b around reflections 502c-502d given the size and spacing of the respective reflections.

It is understood that the example images of FIGS. 5A-5B illustrate are non-limiting, and the images can include more, fewer, or different reflections from controlled light sequence of light sources. In some embodiments, the pattern of light from one or more light sources can be generated to detect surface materials across different regions of the lens or a subset of regions of the lens (e.g., representative locations). In some embodiments, the density and distribution of the pattern of light can be designed to detect the surface material at the desired resolution.

In some embodiments, the surface material detection process of method 400 can be initiated automatically without the need for user input and/or without user notification. In some embodiments, the surface material detection process can be initiated automatically when the optical sensing system is detected on the user (and optionally when a lens is detected by the optical sensing system). In some embodiments, a user interface can display a notification regarding initiation of the material detection process. In some embodiments, the user interface can display a notification of the detection of the surface material. In some embodiments, the user interface can also include one or more user interface elements selectable for initiating a removal process for the surface material. In some embodiments, the removal process can be initiated automatically upon detection of the surface material without the need for user input and/or user notification.

Therefore, according to the above, some embodiments of the disclosure are directed to a method. The method can comprise, at an electronic device in communication with a display and an optical sensing system, generating a first image using the optical sensing system, the first image including one or more reflections from a first attachable lens. In accordance with a determination that one or more criteria are satisfied, the one or more criteria including a criterion that is satisfied when a proportion of the first image having an intensity of light in a first intensity range is greater than a threshold, the method can comprise detecting a surface material on the first attachable lens.

Additionally or alternatively to one or more of the embodiments disclosed above, in some embodiments, the method can further comprise capturing a color image, and converting the color image to a luminance image. Additionally or alternatively to one or more of the embodiments disclosed above, in some embodiments, converting the color image to the luminance image can comprise using a weighted combination of a red component, a blue component, and a green component of the color image. Additionally or alternatively to one or more of the embodiments disclosed above, in some embodiments, the method can further comprise computing a histogram of luminance values in the first image, and determining the proportion of the first image having the intensity of light in the first intensity range using the histogram. Additionally or alternatively to one or more of the embodiments disclosed above, in some embodiments, determining the proportion of the first image having the intensity of light in the first intensity range is greater than the threshold can comprise computing a percentage of the one or more luminance values that fall between a first value and a second value. Additionally or alternatively to one or more of the embodiments disclosed above, in some embodiments, the first value can be 5% to 15% of a total intensity range for images and the second value can be 85% to 95% of a total intensity range for images. Additionally or alternatively to one or more of the embodiments disclosed above, in some embodiments, the surface material can include fog. Additionally or alternatively to one or more of the embodiments disclosed above, in some embodiments, the first image can comprise a luminance image. Additionally or alternatively to one or more of the embodiments disclosed above, in some embodiments, the threshold can be between 5% and 10%. Additionally or alternatively to one or more of the embodiments disclosed above, in some embodiments, the method can further comprise generating a user notification of the detection of the surface material when the surface material is detected on the first attachable lens. Additionally or alternatively to one or more of the embodiments disclosed above, in some embodiments, the method can further comprise generating the first image with a controlled light sequence from one or more light sources included in or attached to the optical sensing system. Additionally or alternatively to one or more of the embodiments disclosed above, in some embodiments, the method can further comprise deactivating the display during the generation of the first image. Additionally or alternatively to one or more of the embodiments disclosed above, in some embodiments, the method can further comprise selecting one or more sub-images from the first image, wherein the criterion that is satisfied when the proportion of the first image having the intensity of light in the first intensity range that is greater than the threshold comprises the proportion of the one or more sub-images having the intensity of light in the first intensity range is greater than the threshold. Additionally or alternatively to one or more of the embodiments disclosed above, in some embodiments, the method can further comprise, in accordance with a determination that one or more criteria are not satisfied, forgoing detecting the surface material on the first attachable lens.

Some embodiments of the disclosure are directed to an electronic device comprising a display, an optical sensing system, one or more processors. The one or more processors can be configured for generating a first image using the optical sensing system, the first image including one or more reflections from a first attachable lens. The one or more processors can be configured for, in accordance with a determination that one or more criteria are satisfied, the one or more criteria including a criterion that is satisfied when a proportion of the first image having an intensity of light in a first intensity range is greater than a threshold, detecting a surface material on the first attachable lens.

Additionally or alternatively to one or more of the embodiments disclosed above, in some embodiments, generating the first image using the optical sensing system can comprise capturing a color image, and converting the color image to a luminance image. Additionally or alternatively to one or more of the embodiments disclosed above, in some embodiments, the one or more processors can be further configured for computing a histogram of luminance values in the first image, and determining the proportion of the first image having the intensity of light in the first intensity range using the histogram. Additionally or alternatively to one or more of the embodiments disclosed above, in some embodiments, the one or more processors can be further configured for selecting one or more sub-images from the first image, wherein the criterion that is satisfied when the proportion of the first image having the intensity of light in the first intensity range that is greater than the threshold comprises the proportion of the one or more sub-images having the intensity of light in the first intensity range is greater than the threshold. Additionally or alternatively to one or more of the embodiments disclosed above, in some embodiments, the one or more processors can be further configured for, in accordance with a determination that one or more criteria are not satisfied, forgoing detecting the surface material on the first attachable lens.

Some embodiments of the disclosure are directed to a non-transitory computer readable storage medium storing one or more programs, the one or more programs comprising instructions, which when executed by one or more processors of an electronic device, cause the electronic device to perform any of the methods described above. Some embodiments of the disclosure are directed to a system comprising a display, one or more lenses, one or more light sources, one or more light detectors, and one or more processors configured to any of the methods described above.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

The invention claimed is:

1. A method comprising:
   at an electronic device including a display and an optical sensing system including one or more image sensors, wherein the optical sensing system is configured to receive a first attachable lens positioned between the one or more image sensors and an eye of a user:
   capturing a first image using the one or more image sensors of the optical sensing system, the first image including one or more reflections from the first attachable lens; and
   in accordance with a determination that one or more criteria are satisfied, detecting a surface material on the first attachable lens.

2. The method of claim 1, wherein capturing the first image using the optical sensing system comprises:
   capturing a color image; and
   converting the color image to a luminance image.

3. The method of claim 1, further comprising:
   computing a histogram of luminance values in the first image; and
   determining a proportion of the first image having an intensity of light in a first intensity range using the histogram.

4. The method of claim 1, further comprising selecting one or more sub-images from the first image, wherein:
   the one or more criteria include a criterion that is satisfied when a proportion of the first image having an intensity of light in a first intensity range is greater than a threshold; and the criterion that is satisfied when the proportion of the first image having the intensity of light in the first intensity range that is greater than the threshold comprises the proportion of the one or more sub-images having the intensity of light in the first intensity range is greater than the threshold.

5. The method of claim 1, further comprising, in accordance with a determination that one or more criteria are not satisfied, forgoing detecting the surface material on the first attachable lens.

6. An electronic device, comprising:
a display;
an optical sensing system including one or more image sensors, wherein the optical sensing system is configured to receive a first attachable lens positioned between the one or more image sensors and an eye of a user;
one or more processors configured for:
    capturing a first image using the one or more image sensors of the optical sensing system, the first image including one or more reflections from the first attachable lens; and
    in accordance with a determination that one or more criteria are satisfied, detecting a surface material on the first attachable lens.

7. The electronic device of claim 6, wherein capturing the first image using the optical sensing system comprises:
    capturing a color image; and
    converting the color image to a luminance image.

8. The electronic device of claim 7, wherein converting the color image to the luminance image comprises using a weighted combination of a red component, a blue component, and a green component of the color image.

9. The electronic device of claim 6, wherein the one or more processors are further configured for:
    computing a histogram of luminance values in the first image; and
    determining a proportion of the first image having an intensity of light in a first intensity range using the histogram.

10. The electronic device of claim 9, wherein determining the proportion of the first image having the intensity of light in the first intensity range is greater than a threshold comprises:
    computing a percentage of the luminance values that fall between a first value and a second value.

11. The electronic device of claim 10, wherein the first value is 5% to 15% of a total intensity range for images and the second value is 85% to 95% of the total intensity range for the images.

12. The electronic device of claim 6, wherein the surface material includes fog.

13. The electronic device of claim 6, wherein the first image comprises a luminance image.

14. The electronic device of claim 6, wherein:
    the one or more criteria include a criterion that is satisfied when a proportion of the first image having an intensity of light in a first intensity range is greater than a threshold; and
    the threshold is between 5% and 10%.

15. The electronic device of claim 6, wherein the one or more processors are further configured for:
    generating a user notification when the surface material is detected on the first attachable lens.

16. The electronic device of claim 6, wherein the one or more processors are further configured for:
    capturing the first image with a controlled light sequence from one or more light sources included in or attached to the optical sensing system.

17. The electronic device of claim 6, wherein the one or more processors are further configured for:
    deactivating the display while capturing the first image.

18. The electronic device of claim 6, wherein the one or more processors are further configured for:
    selecting one or more sub-images from the first image, wherein:
    the one or more criteria include a criterion that is satisfied when a proportion of the first image having an intensity of light in a first intensity range is greater than a threshold; and
    the criterion that is satisfied when the proportion of the first image having the intensity of light in the first intensity range that is greater than the threshold comprises the proportion of the one or more sub-images having the intensity of light in the first intensity range is greater than the threshold.

19. The electronic device of claim 6, wherein the one or more processors are further configured for, in accordance with a determination that one or more criteria are not satisfied, forgoing detecting the surface material on the first attachable lens.

20. A non-transitory computer readable storage medium storing one or more programs, the one or more programs comprising instructions, which when executed by one or more processors of an electronic device, cause the electronic device to:
    capture a first image using one or more image sensors in an optical sensing system of the electronic device, wherein the optical sensing system is configured to receive a first attachable lens positioned between the one or more image sensors and an eye of a user, the first image including one or more reflections from the first attachable lens; and
    in accordance with a determination that one or more criteria are satisfied, detect a surface material on the first attachable lens.

* * * * *